March 24, 1936. F. A. KREBS Re. 19,900

PISTON RING EXPANDER

Original Filed Feb. 15, 1933

Inventor

F. A. Krebs

By Pierce & Kleasyne

Attorneys

Reissued Mar. 24, 1936 Re. 19,900

UNITED STATES PATENT OFFICE 19,900

PISTON RING EXPANDER

Frank A. Krebs, Brooklyn, N. Y., assignor to The Perfect Circle Company, Hagerstown, Ind., a corporation of Indiana Original No. 1,961,001, dated May 29, 1934, Serial No 656,916, February 15, 1933. Application for reissue March 1, 1935, Serial No. 8,931

18 Claims. (Cl. 309—43)

This invention relates to improvements in piston ring expanders and has for an object the provision of a piston ring expander which is simple in design, inexpensive in construction, and efficient and durable in use. A further object is the provision of a piston ring expander which may be inserted with facility behind worn or leaking piston rings for the purpose of augmenting the inherent expanding force of the ring, thus to prevent leakage past the ring. A further object is the provision of a piston ring expander which may be utilized with an "out of round" cylinder to force the ring into non-leaking engagement therewith. A further object is the provision of a piston ring expander which may be utilized with lighter rings than ordinarily in use at the present time, with the expander furnishing the additional expanding force necessary upon lightening of the ring. A further object is the provision of a piston ring expander having improved design and constructional features. A further object is the provision of a piston ring expander comprising a plurality of spring elements adapted to exert pressure circumferentially on the ring, and a carrier for said elements, with the spring elements and the carrier so associated that the possibility of separation or breakage of said parts is substantially eliminated.

Other objects will be in part obvious and in part hereinafter pointed out in connection with the following analysis of this invention, wherein is illustrated one of the various possible embodiments of the present invention, together with certain modifications in detail.

In the drawing—

Figure 1:
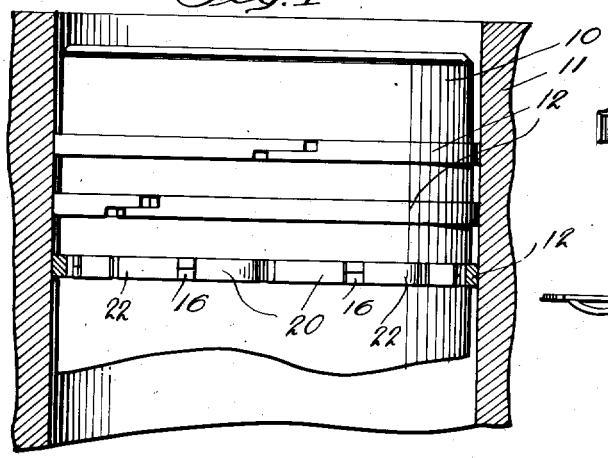
Fig. 1 is an elevation, partly in section, of a piston provided with rings behind one of which is shown the expander in accordance with my invention.

Referring to the drawing, and particularly to Fig. 1, reference character 10 designates the piston of an internal combustion engine which operates in a bore of the cylinder 11. The piston is provided with peripheral grooves into which are fitted the piston rings 12 which possess an inherent expanding force causing the outer faces of the rings to bear against the cylinder wall. The rings 12 may consist of whole rings or of ring portions as is understood in the art. The lowermost ring is broken away to show an expander ring in the groove and operative to exert circumferential pressure on the ring whereby to augment its inherent expanding force.

Figure 2:
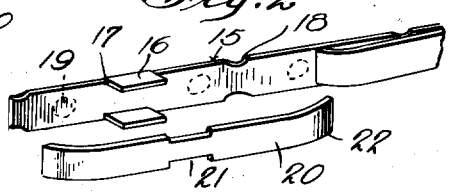
Fig. 2 is a separated detail of the expander elements.
Figure 3:
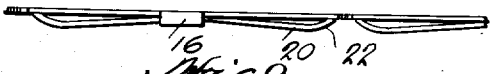
Fig. 3 is a partial edge view of the expander.
Figure 5:
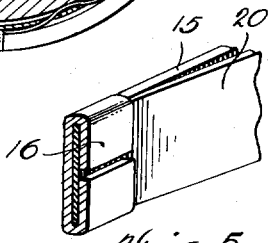
Fig. 5 is a section through the expander on lines 5—5 of Fig. 4.

The expander as shown in detail in Figs. 2, 3 and 5 comprises a carrier band 15 of relatively soft and pliable metal, the band being in width the full width of the ring grooves into which it is to be inserted. In length the band 15 will vary for different bore pistons with which it is to be associated, it being understood that the band is usually designed to extend substantially throughout the circumference of the piston groove.

Along the length of the band are provided pairs of opposed ears 16, preferably formed integrally with the band, the said ears being adapted to be bent at right angles to the band proper. In order that the outer faces of the ears 16 extend flush with the longitudinal edges of the band, the band is slightly undercut at the base of the ears, as at 17, whereby, upon bending, the ears are fully encompassed within the width of the band.

Associated with the band is a plurality of spring steel leaves 20, approximately an inch long, although this may vary somewhat, and of a width to conform to the width of the ring groove. By reference to Fig. 2, it will be noted that the spring leaves are provided, intermediate their ends, with opposed notches 21. The spring elements are properly related with the band by superimposing the leaves in overlying relation on the band so that the ears 16 of the band extend through notches 21. Thereafter the ears 16 are bent over the leaves, as more clearly indicated in Figs. 3 and 5. By such an arrangement the leaves are securely locked to the band 15, with the ears 16 interfitting the notches 21 and serving to prevent longitudinal movement of the elements in relation to each other.

Figure 4:
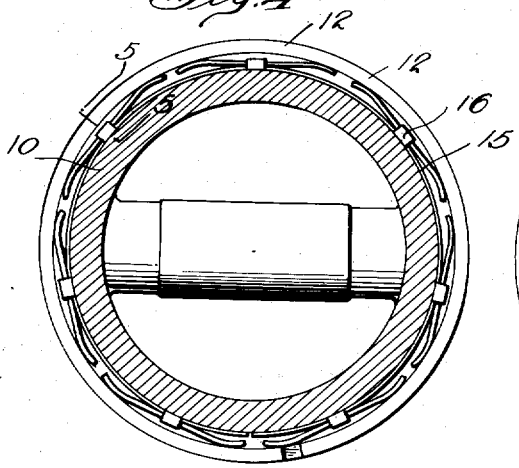
Fig. 4 is a top view of the expander associated in the groove behind the ring.
Figure 7:
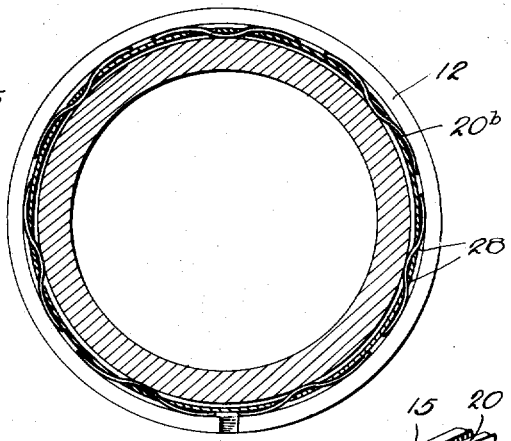
Fig. 7 is a plan view of a further modified form of my invention.

The end portions 22 of the spring leaves are bent or curved or ground so that such portions, which engage the inner peripheral surface of the piston ring, may slide freely thereagainst. In Fig. 4 the expander is shown as seated in the piston groove behind the piston ring 12 and exerting an expanding circumferential pressure on said ring. The soft metal, flexible ring 15 easily adapts itself to circular formation within the groove, and each of the spring elements 20 exerts an independent expanding force against the rear face of the ring, with the curved end portions 22 of the leaves bearing against the ring in such manner that they may readily flex and slide against the ring. Accordingly, a uniform expanding pressure is exerted by the plurality of spring elements, the independent action of the leaves serving, however, to cause proper contact between a portion of the ring and an adjacent "out of round" portion of the cylinder bore.

Among the advantages of the above described ear and notch connection may be noted the following. First, each spring leaf 20 has complete freedom of action and thus strain, either on the leaf itself or which might occur at the joint between the leaf and its carrier band, is substantially eliminated. Secondly, in cases where the cylinders are worn badly, under which condition the piston receives a terrific blow at explosion, the aforesaid type of joint permits the spring leaves to cushion the piston as it raps against the ears 16, which in turn stops the piston from hitting the cylinder wall. Excessive cylinder wear and "piston slap" is thus prevented. Further, breakage of the spring leaves is also substantially eliminated.

The expander as above described, when used in conjunction with a slotted oil ring, may be provided with means to permit oil that passes behind the ring to drain back into the crank case. Such draining means may comprise notches 18 along the edge of the carrier band, or, alternately, the carrier band 15 may be apertured as at 19 at intervals along its length, as indicated in Fig. 2.

Figure 6:
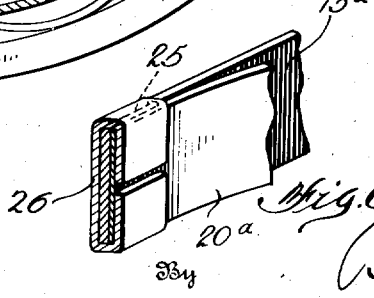
Fig. 6 illustrates in section a modified form of connection between the expander elements.

In Fig. 6 I have shown a modified form of connection between the spring leaves and carrier band. According to such modification, the carrier band 15a, instead of having integral ears, is provided with notches 25 registering with notches 21 of the spring leaves. A clip 26 may pass under the carrier band and extends through notches 25, 21 of the band 15a and spring leaves 20, respectively, the ends of the clip or connecting band being bent over on the spring leaves whereby to secure the latter to the band.

Figure 8:
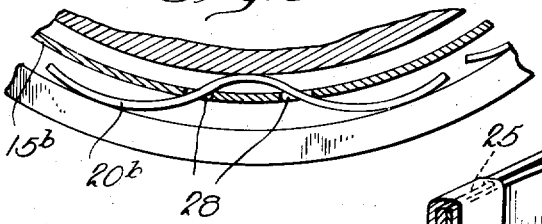
Fig. 8 is a detail in section of the modified expander illustrated in Fig. 7.

In Fig. 8 I have shown a further form of connection between a carrier band 15b and spring leaves 20b. According to such modified construction, the carrier band 15b is made as usual of a width which corresponds to the full width of the ring groove. Along its length the band is provided with pairs of apertures 28 which of course do not extend across the full width of the band. Through such a pair of apertures 28 is threaded a spring-steel leaf, the said leaf having both its ends bent or curved as heretofore, but having its intermediate portion substantially depressed. Thus when the leaves are properly associated with the band, as indicated in Fig. 8, the intermediate portion of the leaf bears against the bottom wall of the ring groove with the curved end portions sliding against the inner face of the piston ring. In this modified form the spring leaf, being substantially the width of the apertures 28, is of lesser width than the band and accordingly of lesser depth than the ring groove.

This latter described form of connection, as with the previous forms, permits the leaves to flex independently of the carrier band and in such manner that the strains of explosion are taken up gradually and do not tend to break the spring or separate the same from the band.

Figure 9:
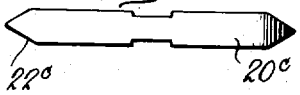
Fig. 9 shows a modified form of spring element for use with a double piston ring.

In Fig. 9, I have illustrated a further modification in the construction of the spring leaves of the type shown in Figs. 2 and 3. According to such modified structure, the spring leaf 20c is provided with tapered ends 22c curved as heretofore described. This type of leaf is advantageously used with a double piston ring. The tapered ends 22c act to separate the two rings, forcing one against the top and the other against the bottom of the ring groove. Such arrangement prevents oil from passing around the ring and stops what is known as "blow-by" or oil pumping.

Without further analysis, the foregoing will so fully reveal the gist of this invention that others can be applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. A piston ring expander comprising a carrier band of soft, pliable metal, a plurality of spring steel leaves overlying the band, the leaves being formed with opposed edge notches intermediate the ends thereof, and means operatively related to said band and extending through the notches for securing the leaves to the band.

2. A piston ring expander comprising a carrier band of soft, pliable metal, a plurality of spring steel leaves overlying the band, the leaves being formed with opposed edge notches intermediate the ends thereof, and the band having ears projecting therefrom to extend through the notches and over the leaves.

3. A piston ring expander comprising a carrier band of soft, pliable metal, a plurality of spring steel leaves overlying the band, the leaves being formed with opposed edge notches intermediate the ends thereof, and the band having ears projecting therefrom to extend through the notches and over the leaves, the ends of the leaves being bent along a curvature.

4. A piston ring expander comprising a carrier band of soft, pliable metal, a plurality of spring steel leaves overlying the band, the leaves being formed with opposed edge notches intermediate the ends thereof, the band and the leaves being provided with edge notches in registry, and an attaching clip extending through said notches and about the band and leaves for securing the latter to the band.

5. A piston ring expander comprising a carrier band of soft, pliable metal, a plurality of spring steel leaves overlying the band, the leaves being formed with opposed edge notches intermediate the ends thereof, the band and the leaves being provided with edge notches in registry, and an attaching clip extending through said notches and about the band and leaves for securing the latter to the band, the ends of the leaves being bent along a curvature.

6. A piston ring expander comprising a band having pairs of apertures arranged therein along its length, and spring leaves threaded through each pair of apertures with the ends of said leaves extending along a curvature.

7. A piston ring expander comprising a band having pairs of apertures arranged therein along its length, and spring leaves each threaded through a pair of apertures with the intermediate portion of the leaf disposed on one side of the band and the end portions of the other.

8. A piston ring expander comprising a band having pairs of apertures arranged therein along its length, and spring leaves each threaded through a pair of apertures with the intermediate portion of the leaf disposed on one side of the band and the end portions on the other, and said end portions being curved.

9. A piston ring expander comprising a carrier band of soft, pliable metal, a plurality of spring steel leaves overlying the band, the leaves being formed with opposed edge notches intermediate the ends thereof, the band having ears projecting therefrom to extend through the notches and over the leaves, and the ends of the leaves being tapered.

10. A piston ring expander adapted to be placed in a piston ring groove behind a piston ring and comprising a carrier band of thin, soft, pliable metal having an axial width substantially equal to that of said piston ring groove, a plurality of spring steel leaves having at least the major portion of their length in overlying substantially concentric relation to said carrier band, and means within the confines of the width of said carrier band connecting the middle portion of said leaves to said carrier band, the end portions of said leaves extending in opposite directions from said connecting means and being adapted to engage the inner periphery of a piston ring.

11. A piston ring expander comprising a carrier band, a plurality of spring leaves overlying the band, the leaves being provided with opposed edge notches intermediate the ends thereof, and the band having ears projecting therefrom and extending through said notches and over the leaves for securing the latter to the band.

12. A piston ring expander comprising a carrier band, a plurality of spring leaves overlying the band, the leaves being provided with opposed edge notches intermediate the ends thereof, the band being provided with edge notches for registry with the notches of the leaves, and securing means extending through registering notches and over the band and leaves for securing the latter to the band.

13. A piston ring expander comprising a carrier band, a plurality of spring leaves overlying the band, the leaves being provided with opposed edge notches intermediate the ends thereof, and means operatively related to said band and extending through said notches and over the leaves for securing the latter to the band.

14. A piston ring expander adapted to be placed in a piston ring groove behind a piston ring and comprising a thin, flexible carrier band, a plurality of independent circumferentially spaced spring leaves in overlying substantially concentric relation to said carrier band, and projections integral with said carrier band at an edge thereof securing the central portion of said leaves to said carrier band, whereby the end portions of the leaves project in opposite directions with respect to said projections and are free to engage the inner periphery of a piston ring.

15. A piston ring expander adapted to be placed in a piston ring groove behind a piston ring and comprising a thin, continuous carrier band, a plurality of spring leaves overlying and substantially concentric with the carrier band, and spaced projections integral with the band at one edge thereof and disposed radially outwardly therefrom and securing the central portion of said leaves to said carrier band, said carrier band being provided adjacent the base of said projections with undercuts whereby said projections lie within the width of said carrier band.

16. A piston ring expander consisting of two functional parts, one of said parts being a thin, continuous, flexible carrier band and the other of said parts being a plurality of spring leaves in overlying, substantially concentric and circumferentially spaced relationship to said band, and means comprising projections integral with the band securing said leaves to said band intermediate the ends of said leaves.

17. A piston ring expander comprising at least two parts, one of said parts constituting a thin, continuous, flexible carrier band and the other a spring leaf, one of said parts being provided with a recess, said parts being arranged in substantially concentric relationship, and means securing said parts in said relationship, said means comprising an integral projection extending from the other of said parts through said recess and contacting with one face of the part having said recess.

18. A piston ring expander adapted to be placed in a piston ring groove behind a piston ring and comprising a carrier band, a plurality of independent circumferentially spaced spring leaves in overlying substantially concentric relation to said carrier band, said leaves being formed with edge notches intermediate the ends thereof and said carrier band being provided with edge notches in registry with the edge notches of said leaves, and an attaching clip extending through said registering notches and about said carrier band and leaves securing the mid-portion of said leaves to said carrier band.

FRANK A. KREBS.